Feb. 18, 1969 A. T. LYBROOK 3,428,116

TEMPERATURE CONTROL SYSTEM

Filed Jan. 26, 1967

INVENTOR.
ARNOLD T. LYBROOK
BY
Yount, Raney, Flynn and Tarolli
ATTORNEYS

United States Patent Office 3,428,116
Patented Feb. 18, 1969

3,428,116
TEMPERATURE CONTROL SYSTEM
Arnold T. Lybrook, Lancaster, Ohio, assignor to Ranco Incorporated, Columbus, Ohio, a corporation of Ohio
Filed Jan. 26, 1967, Ser. No. 611,968
U.S. Cl. 165—26    12 Claims
Int. Cl. F25b *29/00;* F24d *3/00*

ABSTRACT OF THE DISCLOSURE

A temperature control system includes duct means, air chilling means, air heating means, electrically powered blower means for directing air through the duct means to the heating and chilling means, a vane-like blend door supported for pivotal movement in the duct means and moved angularly between limit positions to control the temperature of air exhausted from the duct means, a rotary switch having a contact moved to effect changes in speed of the blower means, with the extent of angular movement of the rotary switch contact being greater than the angular movement of the blend door, and means for driving the blend door and switch contact including a linkage operable to positively drive the blend door between its limits of angular movement and permitting continued driving of the rotary switch when the blend door is in a limit position.

Cross referenced application

U.S. patent application Ser. No. 612,043, filed Jan. 26, 1967.

Background of the invention

The present invention relates to air tempering systems and more particularly to air tempering systems for automotive vehicles equipped with an air conditioning unit and a heater which may or may not be simultaneously operated to produce a controlled temperature within a passager compartment of the vehicle.

Air tempering systems of the type referred to have utilized variable speed air blowers and dampers or valves which cooperate to control heat transfer between air and heat exchangers in the system. Frequently these systems have required the blower speed to be variable when the valve or damper-like blend door is in an extreme limit position in order to obtain maximum heating or cooling effects. Furthermore the blower speeds are varied when the valve or blend door is positioned away from the limit position so that gradually changing duct air temperatures are produced to more accurately maintain the conditioned air space at a desired temperature.

The prior art

The prior devices for varying blower speeds in connection with blend door movement have generally utilized individual fluid operated actuators for the door and blower speed switch. The systems have sometimes included valves controlling one actuator in response to operation of the other. These systems have been subject to variations in system fluid pressure which may result in failure of the actuators to operate in unison when desired. Furthermore these systems are difficult to install and service efficiently.

Summary of the invention

An object of the present invention is the provision of a new and improved air temperature control system including duct means, a heat exchanger, a member movable between fixed limit positions and effective to control heat exchanged between the heat exchanger and air in the duct means in response to such movement, rotatable drive means for the movable member including a driving member movable about an axis, a driven member movable about an axis and having a limit position, and linkage means connecting the driving and driven members which is operable to positively drive the driven member to its limit position and to maintain the driven member in its limit position during continued movement of the driving member.

Another object of the present invention is the provision of a new and improved linkage in an air temperature control system for transmitting motion from a rotatable driving member to a driven member which is rotatable to a fixed limit position, the linkage including a link member supported by one of the driving and driven members and slidably connected to the driving and driven members respectively, biasing means for maintaining the link member in a first position relative to the driving and driven members when the driven member is not in its limit position, and wherein the link member shifts and rotates relative to the members against the force of the biasing means as the driving member continues to rotate when the driven member is in its limit position.

A further object of the present invention is the provision of a new and improved linkage as set forth in the next preceding paragraph wherein the link member includes a cam surface engaged with a cooperable surface on the one of the members supporting the link member and wherein the link member is connected to the driving and driven members by pin and slot connections permitting rotating and sliding of the link member relative to each of the driving and driven members.

Other objects and advantages of the present invention will become apparent from the following detailed description thereof and from the accompanying drawings which form a part of the specification and wherein.

Figure 1:
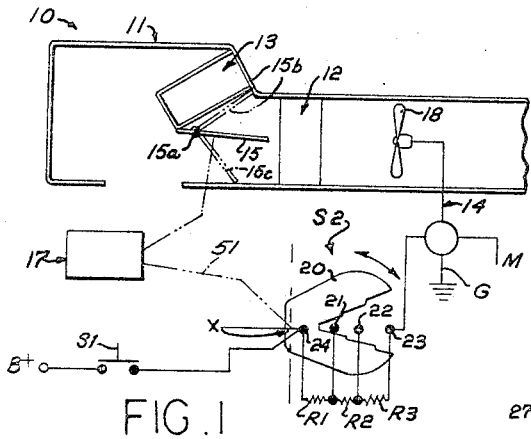
FIG. 1 is a schematic representation of a portion of an air tempering system embodying the invention.

As illustrating a preferred embodiment of the invention, there is shown in the drawings a temperature control system 10 for an automotive vehicle or the like, not shown, wherein outside air or recirculated air may be cooled, cooled and reheated, or heated and then directed into a passenger compartment of the vehicle at a desired temperature. The temperature control system 10 includes duct means 11, an air cooling heat exchanger unit 12, which may be the evaporator coils of a conventional automotive air conditionoing unit, not shown, an air heating heat exchanger 13, which may be a heater core of a conventional automotive heater having engine coolant flowing therein, an electrically energized blower 14 for providing a forced flow of air in the duct means, a vane or door-like member 15 which is moved to direct more or less air which has been flowed across the cooling heat exchanger 12 through the heater core 13 depending upon the positioning of the door 15. The door 15 effectively splits the flow of air in the duct means 11 to provide heating of a portion of the air and the split flow is subsequently mixed or blended before entering the passenger compartment so that a controlled temperature can be maintained in the passenger compartment.

The blend door 15 is pivoted at 15*a* and is movable about its pivot between a position 15*b* wherein air which is passed through the cooling unit 12 is directed by the blend door away from the heater core 13 to be exhausted from the duct means at a relatively low temperature, and a position 15*c* wherein all of the air flowing through the air cooling unit 12 is directed through the heater core 13 so that air exhausted from the duct means 11 is at a relatively high temperature. When the blend door 15 is in any position intermediate its positions 15b, 15c a portion of the air which is passed across the air cooling unit 12 is directed through the heater core 13 and is reheated, while the remaining air is diverted away from the heater core such that the air exhausted from the duct means 11 is mixed to provide a controlled temperature of the exhaust from the duct means and which temperature depends upon the position of the blend door 15 as mentioned above.

The blower unit 14 includes a suitable fan 18 positioned in the duct means 11 and an electrically energized motor M mechanically connected to the fan 18 so as to drive the fan and produce a forced flow of air through the duct means and across the heat exchangers in the manner previously described. An energization circuit for the motor M may be traced from a terminal B+ of a suitable power supply, such as the battery of the vehicle, through a conventional control switch S1, which may be of the push button type, contacts of a rotary switch S2, windings of the motor M and to the ground terminal G of the power supply. The rotary switch S2 includes a moving contact 20 which is preferably a copper conductor suitably fixed to a phenolic disc, not shown, and rotatable about an axis X, and fixed contacts 21, 22, 23, 24 engageable with the moving contacts 20. The moving contact 20 is preferably always closed on the contact 24 to complete an energizing circuit for the motor M which can be traced from the power supply through closed contacts of the switch S1, contacts 20, 24, resistors R1, R2, R3 to the contact 23, through the motor windings and to the ground terminal G.

When the moving contact 20 is rotated to close on the contact 21, the resistors R1 is removed from the energizing circuit from the motor M, thereby increasing the voltage drop across the motor and increasing its speed. Closing of the moving contact 20 on the contact 22 removes resistors R1, R2 from the energizing circuit for the motor M to further increase speed thereof and when the contact 20 is closed on the contact 23, the motor M is operated at its maximum speed. It should be apparent that the switch S2 is shown only diagrammatically in FIG. 1 and that such a switch may take many physical forms. It is apparent that the switch S2 can be replaced by suitable variable power resistors so as to effect an infinite variation in speed of the motor M to its maximum speed in substantially the same manner as described above. It should also be understood that the switch S2 can be constructed to perform switching functions in addition to those described; for example, the switch S2 can be constructed to control positioning of dampers, or the like, positioned in the duct means, and which have not been shown.

The moving contact 20 of the switch S2 and the blend door 15 are mechanically linked by a servo-unit 25 which forms a part of the control means 17. The servo-unit 25 is operative to move the blend door 15 to any desired position between its extreme positions 15b, 15c and simultaneously moves the moving contact 20 of the switch S2 so as to vary the speed of the blower motor M according to positioning of the blend door 15. Under certain circumstances it is desirable to continue increasing the speed of the blower motor M to force additional air through the duct means 11 when the blend door is in either of its limiting positions 15b, 15c. For example, when the blend door is in its position 15b, wherein air which is flowed through the cooling coils 12 is diverted from the heater core and directed into the passenger compartment, but the passenger compartment air temperature is not as low as desired, increasing the flow of air through the duct means 11 by speeding up the operation of the blower motor 14 provides further decreases in passenger compartment temperature to the desired level. Conversely, when the blend door 15 is in its position 15c wherein heated air is supplied to the passenger compartment, and the passenger compartment is not heated to the desired tempearture, the speed of the blower motor 14 is increased to provide still higher temperature air from the duct means in the manner described above, after the blend door 15 has reached its limit position 15c.

Figure 2:
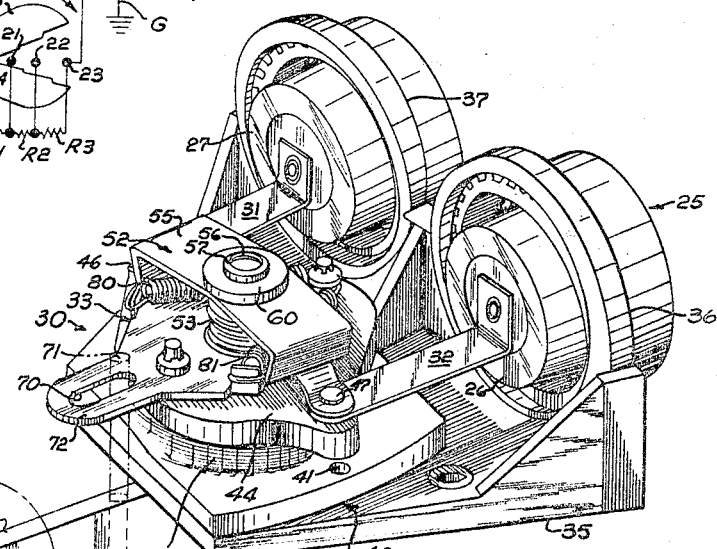
FIG. 2 is a perspective view of a portion of the air tempering system of FIG. 1.

As shown in FIG. 2, the servo-unit 25 includes vacuum pressure operated diaphragm type motors 26, 27 which are associated with individual valves, not shown, of the control means 17 for effecting movement of the blend door 15 and contact 20 of the switch S2 in response to operation of such valves. The valve for controlling operation of the motors 26, 27 are themselves operated in response to sensed temperature in the passenger compartment of the vehicle and the particular structure for operating the valves is described in detail in U.S. patent application Ser. No. 612,043 filed Jan. 26, 1967 assigned to Ranco Incorporated. Suffice it to say that such valves expose the motors 26, 27 individually to internal vacuum pressure so as to effect rotation of a driven assembly 30 through driving links 31 or 32. The motors 26, 27 are normally vented to atmosphere to maintain the blend door 15 in a position to which it was moved by the servo-unit 25 and for this reason the diaphragms of the motors are devoid of biasing springs which might otherwise urge the motors away from a particular position at which the diaphragms were vented. When the motor 26 is exposed to vacuum pressure and the motor 27 remains vented to atmosphere, the driven assembly 30 is moved in a countercolckwise direction as viewed in FIG. 2 and effects clockwise movement of the blend door 15 through the linkage 33 toward its position wherein higher temperature air is supplied to the passenger compartment.

The servo-unit 25 is preferably mounted on an upper wall of the duct means 11 adjacent the pivot axis 15a of the blend door 15 and includes a base member 35 having spaced supports 36, 37 extending upwardly therefrom, as viewed in FIG. 2 which support the vacuum motors 26, 27. The base member 35 is adapted to be connected to the duct means by suitable screws which extend through the base member and the upper wall of the duct means and which connections are not shown in detail.

The assembly 30 is supported on the base 35 and includes a fixed support member 40 connected to the base member 35 by suitable screws 41 and which support member 40 includes an inverted cup-like portion 43 which supports a disc-like rotatable drive member 44. In the preferred embodiment, a friction disc, not shown, is interposed between the rotatable disc-like member 44 and an upper support surface of the cup-like portion 43 so as to resist relative rotation therebetween for a purpose which will become apparent.

The disc member 44 includes drive lugs 46, 47 extending upwardly therefrom and which provide a driving connection between the member 44 and the links 31, 32, respectively, connected to the motors 26, 27. A square or polygonal opening 50 is provided in the center of the member 44 and which receives a shaft member 51 having a corresponding polygonal-shaped cross-section so that the shaft member is driven by the member 94 when the member 44 rotates. The shaft member 51 extends through the member 44 and into a chamber formed by the cup-like portion 43 and in which is located the moving contact 20 of the switch S2, which has not been shown in FIG. 2.

While any suitable driving arrangement can be provided between the shaft member 51 and the moving contact 20, the preferred embodiment employs a driver plate integrally formed on the shaft member 51 and which plate drives the contact 20 through a conveniently formed key and keyway arrangement. The fixed contacts 21–24 of the switch S2 are fixed in the base 35 and the resistors R1–R3 are connected between conductors, not shown in FIG. 2, between the servo-unit 25 and the motor M.

The shaft 51 is urged upwardly relative to the base 35 by spring tensioning means generally indicated at 52 which includes a helical spring 53 compressed between annular shoulder 54 formed on the drive member 44 which surrounds the aperture 50, and a spring plate 55 which is connected at its ends to the drive lugs 46, 47 and which includes suitable aperture for receiving an upper end of the shaft 51. The upper end of the shaft 51 includes an axially extending threaded opening for receiving a screw 56 which carries a washer 57 and tensioning washers 60 interposed between the head of the screw and the spring plate 55 so that when the screw is advanced through the threaded opening of the shaft 51, the spring 53 is compressed between the member 34 and the spring plate 55.

The spring 53 in addition to urging the shaft 51 upwardly, as described, urges the member 44 and the friction disc associated therewith into engagement with the upper surface of the cup-like portion 43 and with the amount of spring force controlling the frictional force between the friction disc and the member 44.

Figures 3, 4:
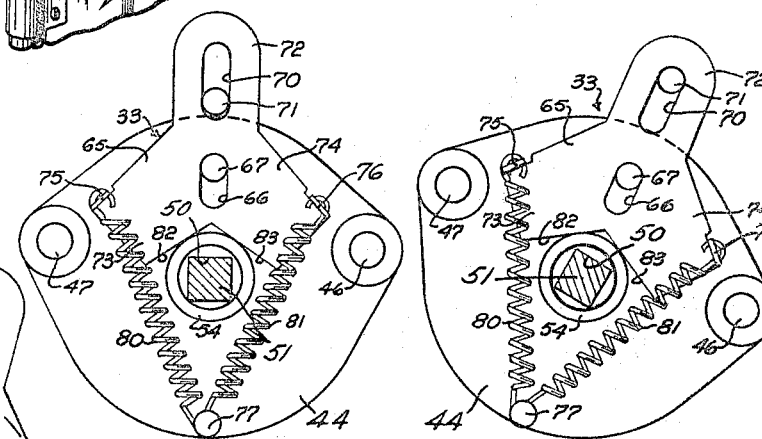
FIGS. 3, 4, and 5 are fragmentary views of the apparatus of FIG. 2 having parts removed and showing different operative positions.
Figure 5:
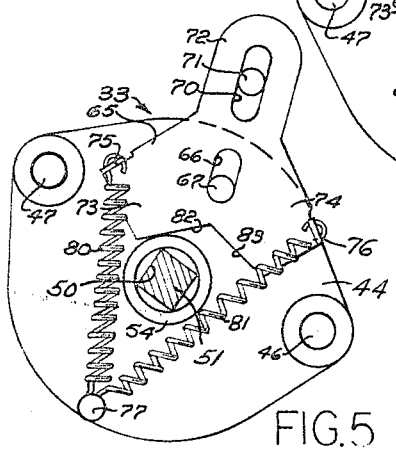

As noted previously, the amount of rotation necessary for the switch S2 to perform all of its switching functions is greater than the amount of rotation necessary to move the blend door 15 between its limit positions 15b, 15c and for this reason, the linkage 33 is constructed so as to positively transmit a driving force between the drive member 44 and the blend door when the blend door is at, or intermediate, its limit positions and yet permit further rotation of the member 44 while positively holding the blend door in either of its limit positions 15b, 15c. As illustrated in FIGS. 3–5 the linkage 33 includes a plate-like generally Y-shaped member 65 having an elongate opening 66 generally at the central portion thereof which receives a circularly cross-sectioned drive lug 67 connected to the member 44 and projecting upwardly through the opening 66 for slidable engagement with the sides of the opening. A similar elongate opening 70, having its longitudinal axis aligned with the longitudinal axis of the opening 66, is formed in the member 65 outwardly of the opening 66 and slidably receives a pin 71 fixed to the blend door 15. The aperture 70 is formed in a projecting portion 72 of the link member 65 and which extends outwardly from the member 44 such that the pin 71 is received in the aperture 70 without interference with the base 35 of the servo-unit 25.

The link member 65 additionally includes arms 73, 74 each of which includes upstanding tabs 75, 76 which are connected to a pin 77 formed integrally with the drive member 44 by way of tensioning springs 80, 81. The springs 80, 81 are substantially identical and maintain angularly related sides 82, 83 of the arms 73, 74 respectively in engagement with the shoulder 54 formed on the member 44 so that the longitudinal axes of the apertures 66, 70 lie along a radial line through the axis of rotation of the shaft 51. The parts of the linkage 33 and the member 44 are maintained in their relationship just described when the blend door 15 is in any position between its limiting positions except that the pin 71 connected to the blend door slides longitudinally in the aperture 70 and rotates slightly relative thereto as the blend door moves between a limiting position and a position wherein the door is medially located with respect to its positions 15b, 15c. The above-described relationship between the elements of the linkage 33 is illustrated in FIGS. 3 and 4 with the latter-mentioned figure illustrating the position of the drive member 44 and the elements of the linkage 33 when the blend door 15 is in its limit position 15b to provide a maximum flow of cooling air to the vehicle passenger compartment.

As the drive member 44 continues to move in a clockwise direction when the blend door 15 is in its position illustrated in FIG. 4 the link member 65 is moved relative to the member 44 toward its position shown in FIG. 5. It is apparent that as the member 44 continues to rotate with the blend door in its limit position a twisting couple is exerted on the member 65 by the pins 67, 71 which results in sliding movement between the side 82 of of the arm 73 and the shoulder 54 on the drive member 44. During sliding movement of the side 82 relative to the shoulder 54 the member 65 is cammed radially outwardly of the member 44 and twisted slightly in a counterclockwise direction as viewed in the drawings against the spring force of the spring 81 so that the longitudinal axes of the apertures 66, 70 are no longer on a radial line through the axis of rotation of the shaft 51.

The spring tension of the spring 81 tends to turn the member 65 clockwise about the pin 67 and in so doing exerts a force on the pin 71 which is effective to maintain the blend door 15 in its limit position described above while permitting continued rotation of the moving contact 20 of the switch S2, and thereby further increasing the blower speed as described.

When the pin 67 engages the radially inner end of the slot 66 (see FIG. 5), the link member 65 is locked against further movement relative to the drive member 44 so that the link member and drive member form a rigid linkage between the drive link 31 and the blend door. This construction permits the motor 37 to exert its full force on the blend door to maintain the blend door tightly closed in its limit position and permits the use of springs 30, 31 having a lesser spring rate than would otherwise be necessary.

As the drive member 44 turns in a counterclockwise direction from its position illustrated in FIG. 5, the side 82 of the arm 73 is moved along the shoulder 54 by the force of the spring 81 so that the member 65 is cammed into its position illustrated in FIGS. 3 and 4 at which position the tension of the springs 80, 81 is again balanced and the longitudinal axes of the apertures 66, 70 again lie along a line through the axis of rotation of the shaft 51.

It is apparent that counterclockwise rotation of the member 44 drives the blend door 15 to its limiting heating position and that further rotation of the member 44 causes the switch S2 to increase the speed of the blower when the blend door is maintained in its limit position in a similar manner to that described in reference to the movement of the member 44 in a clockwise direction. For this reason further description of the relationship between the linkage 33 and the member 44, switch S2 and the blend door 15 is not believed necessary.

While but a single embodiment of the present invention has been illustrated and described herein in considerable detail, it is to be understood that the present invention is not to be considered limited to the precise construction shown, it is rather my intention to cover hereby all adaptations, modifications and uses of the present invention which fall within the scope of the appended claims.

I claim:

1. A linkage for transmitting rotational movement from a driving member rotatable about an axis to a driven member which is rotatable about an axis and movable to a limit position and comprising a link member between said driving and driven members and connected to said members by pin and slot connections, biasing means connected between said link member and one of said driving and driven members and operable to maintain said link member in a first position relative to said one of said members as said driven member is moved to said limit position and with said pins of said pin and slot connections having a fixed angularity with respect to the axis of rotation of said one of said members when said driven member is moved to said limit position, said driven member in its limit position operable to exert a force on said link member as said driving member continues to rotate which force is effective to overcome the force of said biasing means and shift said link member from said first position and relative to said one of said members and change the angularity between said pins of said pin and slot connections relative to said axis of rotation of said one member with said driving member continuing to rotate while said driven member is maintained in said limit position.

2. A linkage as defined in claim 1 wherein said driving and driven members rotate in opposite rotational directions about their respective axes.

3. A linkage as defined in claim 2 wherein said link member includes a cam surface engaged with a cooperating surface on said one of said members with said cam surface and said cooperating surface relatively slidable when said link member shifts relative to said one of said members.

4. A linkage as defined in claim 1 wherein said biasing means includes first and second similar spring members operable to exert equal forces urging said link member in opposite directions relative to said one of said members as said driven member is moved toward said limit position and with the force exerted by one of said spring members increasing relative to the force of said other spring member as said driving member continues to rotate when said driven member is in said limit position.

5. A linkage as defined in claim 4 wherein said one of said spring members is effective to return said link member to its said first position when the direction of rotation of said driving member is reversed to move said driven member from its limit position.

6. A linkage as defined in claim 1 wherein said link member is generally Y-shaped and said pin and slot connections are provided by pin members extending from said driving and driven members and elongate apertures in said link member, said pin members extending through said apertures and slidingly engaged with sides thereof.

7. A linkage as defined in claim 6 wherein said elongate apertures have longitudinal axes extending co-linearly and radially from an axis of rotation of said one of said members when said driven member is positioned away from its limit position.

8. A temperature control system comprising duct means for directing air to an air space to be conditioned, heat exchanger means in said duct means in heat exchange relation with air therein, blower means including an electrically energized motor for providing a forced flow of air to said heat exchanger means, a movable member for changing the amount of heat transfer between said air and said heat exchanger means to vary the temperature of air directed to said air space, speed control means including a part movable to vary the speed of said electrically energized motor, and actuating means for controlling movement of said movable member and said part of said speed control means, said actuating means including motor means, a drive member connected to said motor means for rotation in opposite directions about an axis and connected to said part of said speed control means for effecting movement thereof, and linkage means between said driving member and said movable member operable to positively drive said movable member between fixed limit positions thereof and including a link member for maintaining said movable member in a limit position while said driving member continues to move said part of said speed control means.

9. A temperature control system as defined in claim 8 wherein said link member includes a centrally disposed elongate opening therein for receiving a pin member on said driving member, and an elongate opening in a projecting leg portion of said link member for receiving a pin connected to said movable member, said openings in said link member each having a longitudinal axis lying on a radial line from the axis of rotation of said drive member when said movable member is at or intermediate said limit positions.

10. A temperature control system as defined in claim 9 wherein said linkage means further includes biasing means acting on said link member and maintaining said link member in a predetermined position relative to said driving member when said movable member is intermediate said limit position.

11. A temperature control system as defined in claim 10 wherein said link member further includes cam surfaces cooperable with a surface on said driving member and movable relative to said surface on said driving member when said driving member continues to rotate with said movable member in one of said limit positions, said cam surfaces operable to shift said link member relative to said driving member against said biasing means and shift said longitudinal axes of said opening away from said radial lines.

12. A temperature control system as defined in claim 9 wherein said opening includes a wall portion engaged by said pin when said movable member is in a limit position to lock said link member relative to said driving member and permit said motor means to positively maintain said movable member in its limit position.

References Cited

UNITED STATES PATENTS 2,273,000  2/1942  Hans _____ 237—2

EDWARD J. MICHAEL, *Primary Examiner.*

U.S. Cl. X.R.

74—96; 237—8